United States Patent
Lemay et al.

(10) Patent No.: US 8,155,505 B2
(45) Date of Patent: Apr. 10, 2012

(54) HYBRID PLAYLIST

(75) Inventors: Steve Lemay, San Francisco, CA (US);
Charles Pisula, San Jose, CA (US);
Sean Kelly, Cupertino, CA (US);
Patrick Coffman, San Francisco, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 649 days.

(21) Appl. No.: 12/354,632

(22) Filed: Jan. 15, 2009

(65) Prior Publication Data

US 2009/0304359 A1  Dec. 10, 2009

Related U.S. Application Data

(60) Provisional application No. 61/059,741, filed on Jun. 6, 2008.

(51) Int. Cl.
*H04N 5/93* (2006.01)
(52) U.S. Cl. ......................................... 386/281; 386/285
(58) Field of Classification Search .................. 386/281, 386/282, 285, 323, 324, 337, 362
See application file for complete search history.

(56) References Cited

U.S. PATENT DOCUMENTS

2004/0105661 A1* 6/2004 Seo et al. ........................ 386/95
2011/0219460 A1* 9/2011 Baird-Smith et al. ........... 726/30
* cited by examiner

*Primary Examiner* — Robert Chevalier
(74) *Attorney, Agent, or Firm* — Fish & Richardson P.C.

(57) ABSTRACT

Methods, systems, and computer-readable medium for playing media files of a playlist on a mobile device. The media of the playlist include one or more audio files and one or more video files. Playing a first video file of the playlist on the mobile device includes playing an audio component and a video component of the first video file.

19 Claims, 9 Drawing Sheets

HYBRID PLAYLIST

CROSS-REFERENCE TO RELATED APPLICATIONS

This application claims the benefit under 35 U.S.C. §119 (e) of U.S. Provisional Application Ser. No. 61/059,741, filed on Jun. 6, 2008.

TECHNICAL FIELD

The subject matter of this patent application is generally related to playing media files.

BACKGROUND

Conventional mobile devices can include applications that provide various services, such as audio services and video services. Typically, an audio application can only play audio files. If an audio application is able to play a video file, the audio application can generally only play an audio component of the video file. An example video file is a music video that includes an audio track that is separate from a video track.

A user who wishes to play a music video included in a hybrid playlist of media files using an audio application of a mobile device is typically limited to listening to the audio track of the music video and viewing a still image associated with the music video. In order to view the video component of the music video, the user must generally exit the audio application and launch a video application on the mobile device to play both the audio component and the video component of the music video.

SUMMARY

A technique, method, apparatus, and system are described to play media files of a hybrid playlist on a mobile device.

In general, one aspect of the subject matter described in this specification can be embodied in methods that include the actions of playing a first video file of a playlist on a mobile device, the playlist including one or more audio files and one or more video files, where playing the first video file includes playing on the mobile device an audio component and a video component of the first video file. Other embodiments of this aspect include corresponding systems, apparatus, and computer program products.

These and other embodiments can optionally include one or more of the following features. The method can further include playing an audio file of the playlist on the mobile device, where playing the audio file includes displaying on the mobile device an image associated with the audio file and playing on the mobile device an audio component of the audio file. The video file can be played with a landscape orientation before the audio file is played and the audio file is played in a presentation mode with a landscape orientation. The video file can be played after the audio file is played and the audio file is played in a presentation mode with a portrait orientation or a coverflow mode with a landscape orientation. The one or more video files can include at least one of a movie, a television show, a music video, or a video podcast. The playlist can be determined by a user of the mobile device. The mobile device includes a multi-touch-sensitive display.

The details of one or more embodiments of the invention are set forth in the accompanying drawings and the description below. Other features, aspects, and advantages of the invention will become apparent from the description, the drawings, and the claims.

DETAILED DESCRIPTION

Example Mobile Device

Figure 1A:
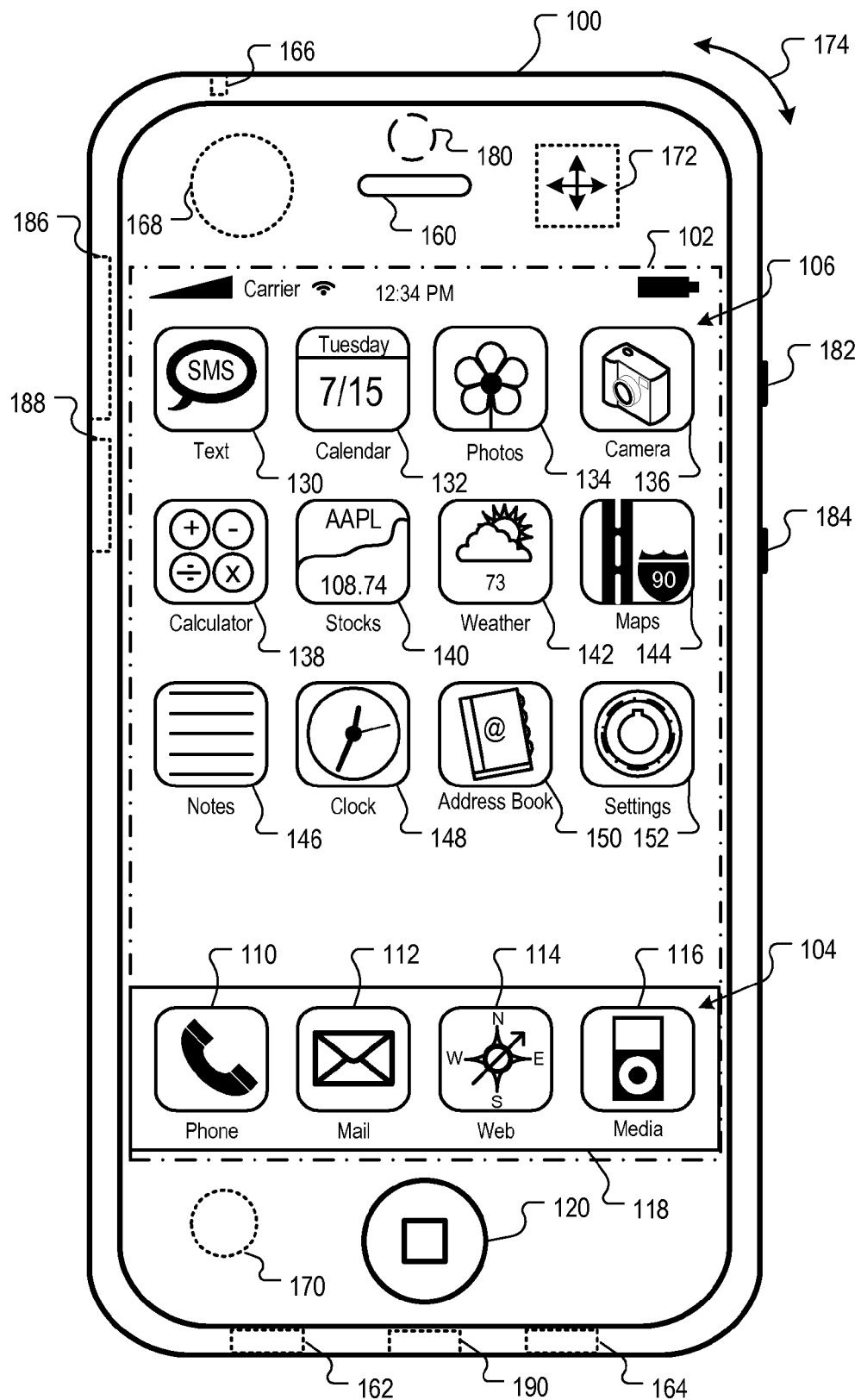
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106 are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
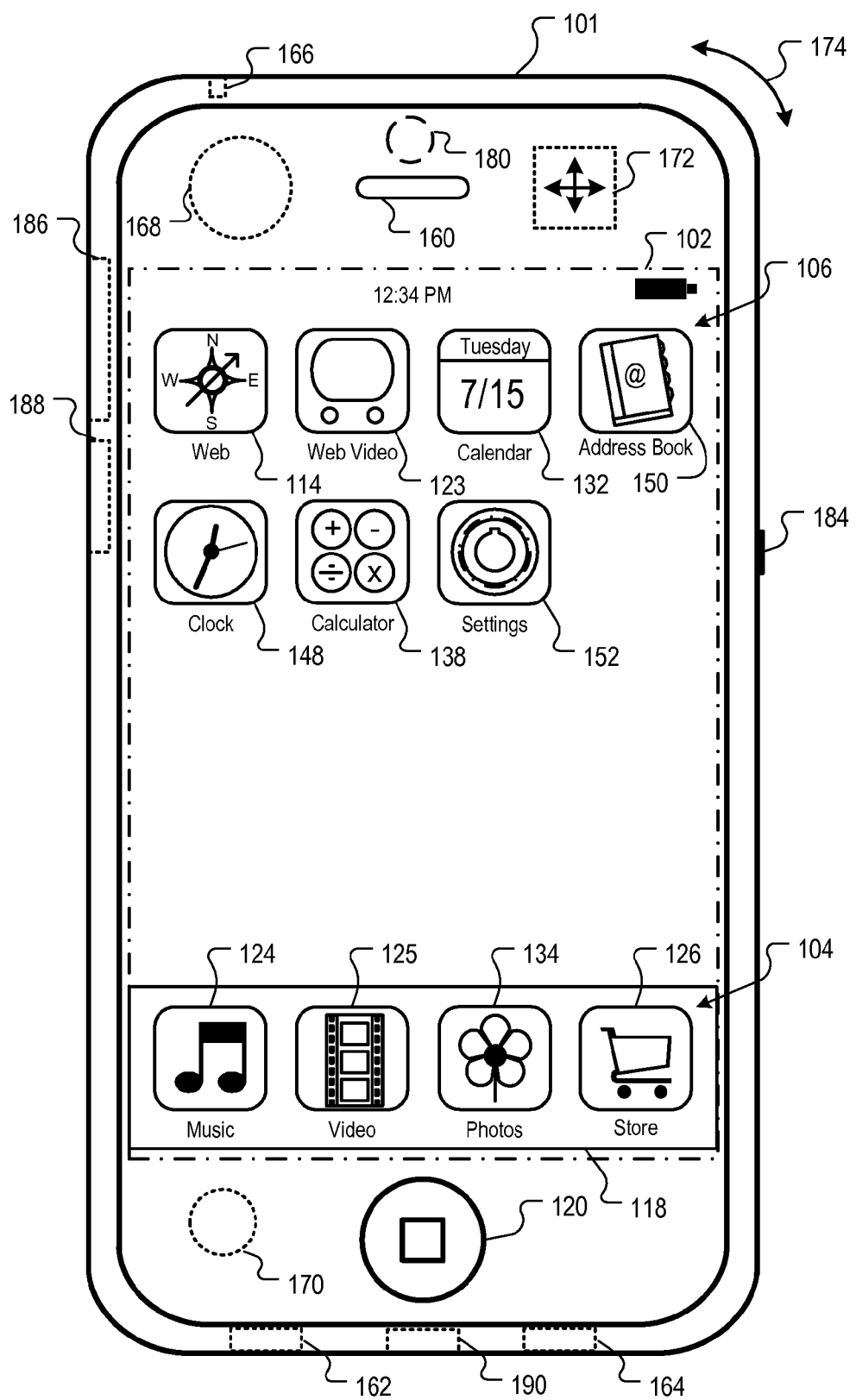
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
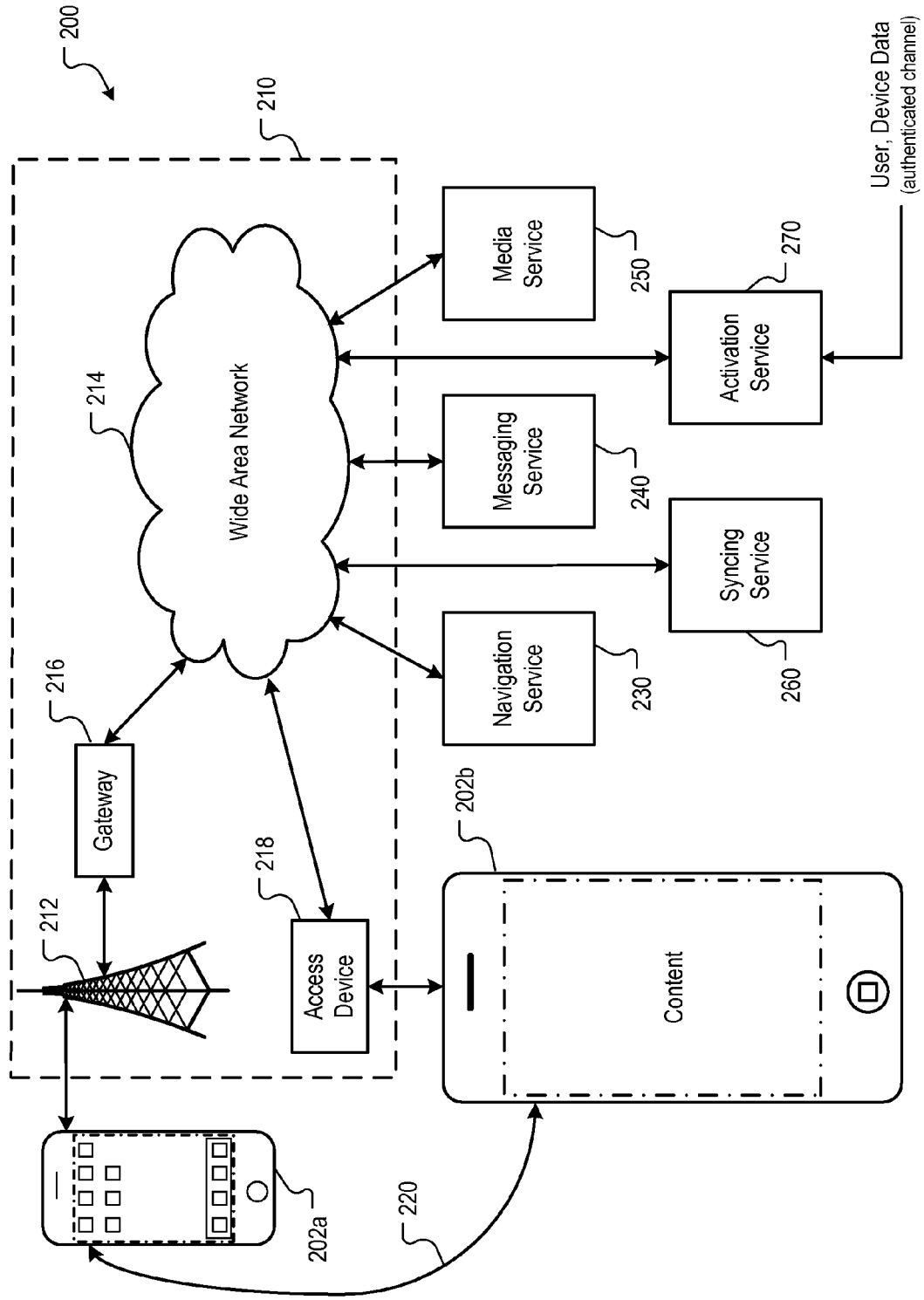
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
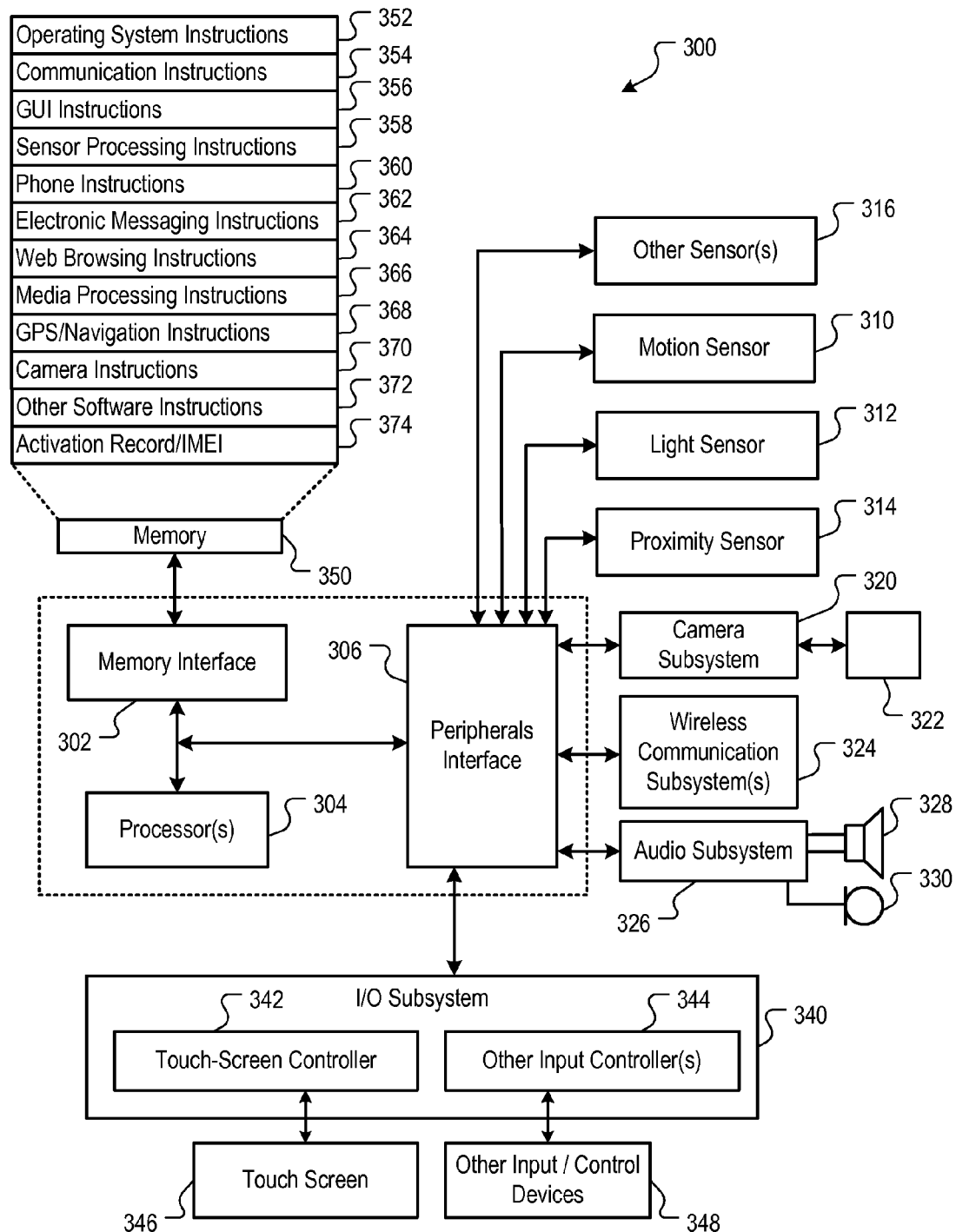
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIG. 4.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIG. 4. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4:
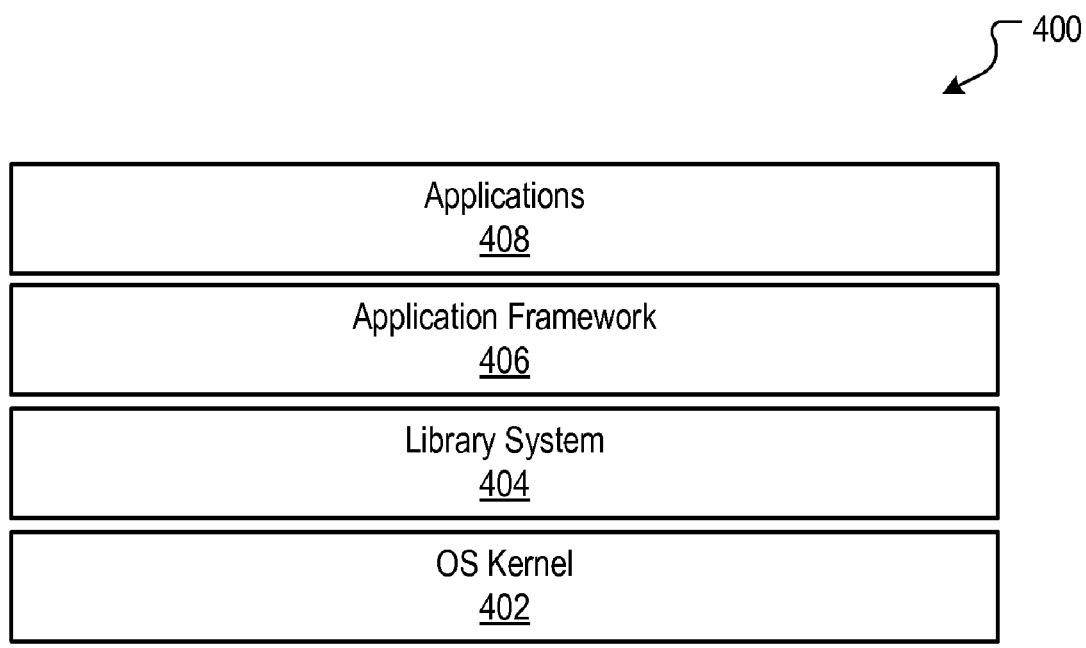
FIG. 4 illustrates an example implementation of a software stack for the mobile devices of FIGS. 1A-1B.

FIG. 4 illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process for remote access management.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Hybrid Playlist Interface

Figure 5:
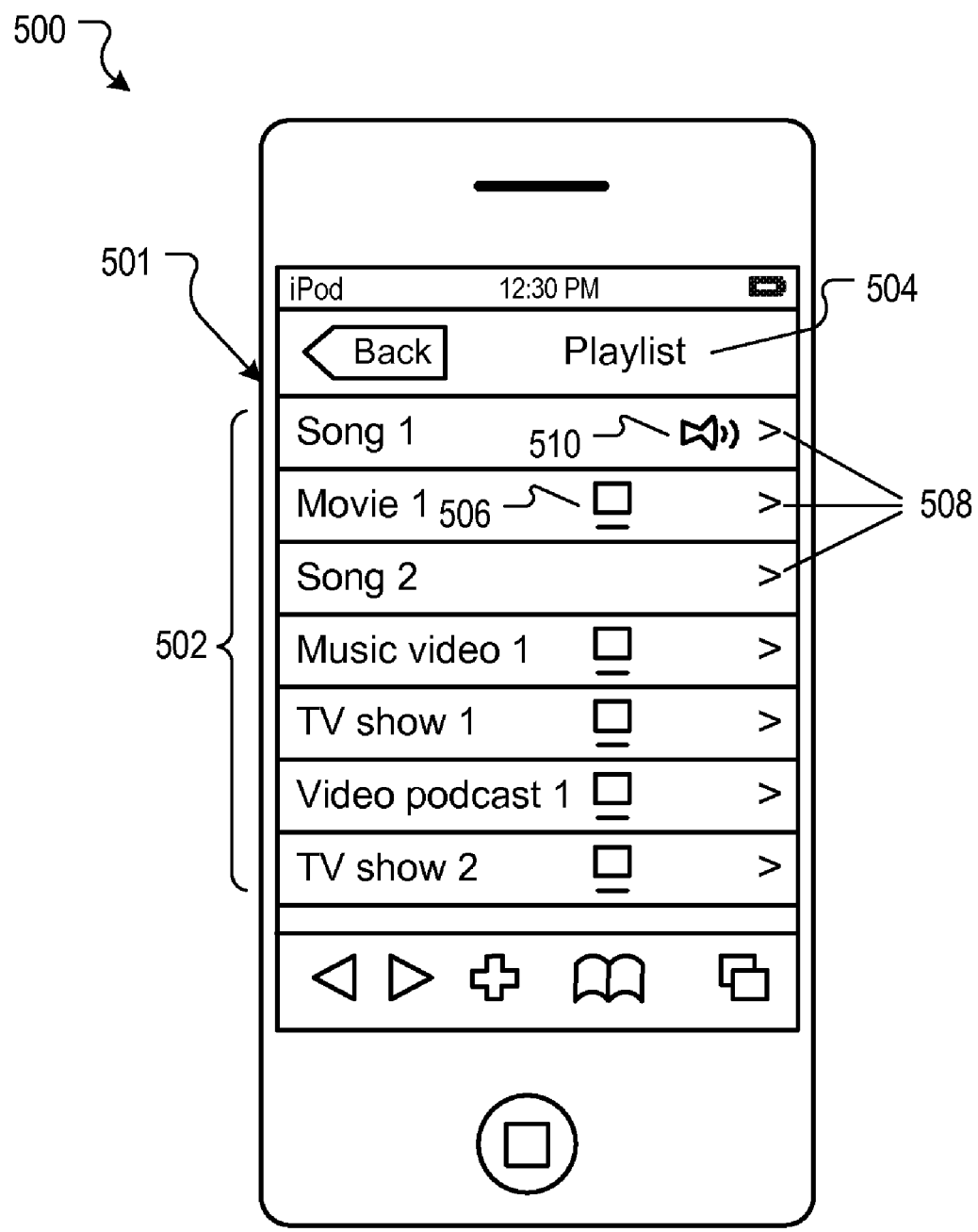
FIG. 5 illustrates an example of a hybrid playlist interface on a mobile device.

FIG. 5 illustrates an example of a hybrid playlist interface 500 on a mobile device. The example hybrid playlist interface 500 (e.g., a graphical user interface), can include a touch-sensitive display for conveying information to a user and for receiving input from a user. For example, the user can provide gesture input to the touch-sensitive display for selecting a media file from a list of media files 502 included in a hybrid playlist 501. In some implementations, the user can navigate to the hybrid playlist interface 500 by selecting a display object, such as the media object 116 or the music object 124 on the device 100 and the device 101, respectively. In some implementations, the user can navigate to the hybrid playlist interface 500 by selecting (e.g., double-tapping) a hardware control, such as the button 120 on the device 100 or 101, for example.

The hybrid playlist interface 500 displays the list of media files 502 included in the hybrid playlist 501, which can be labeled (e.g., by playlist label 504) in the interface 500. The media files 502 of the hybrid playlist 501 include one or more audio files and one or more video files. The hybrid playlist 501 can be determined by a user (e.g., the owner) of the mobile device. Examples of audio files include songs, audio books, and audio podcasts. Examples of video files include movies, television shows, music videos, and video podcasts. In some implementations, a video symbol or icon 506 can indicate to a user which media files 502 of the hybrid playlist 501 are video files. In some implementations, the hybrid playlist 501 can include other forms of media files, e.g., images or slideshows. The media files 502 can be stored in the memory of device 100 or 101.

Each of the media files 502 can be associated with an interface element (e.g., arrows 508) of the hybrid playlist interface 500. The interface element allows the associated media file to be selected by a user for execution (e.g., playback) on the mobile device. For example, user gesture input selecting the arrow 508 associated with Song 1 of the hybrid playlist 501 can cause an audio application to play Song 1 on the mobile device. Examples of playing an audio file (e.g., Song 1) on the mobile device are illustrated in FIGS. 6A-6B.

In some implementations, while an audio file is playing on the mobile device and an audio interface is displayed on the mobile device, the user can return to the hybrid playlist interface 500 by selecting an interface element, e.g., an arrow or a back button, included in the audio interface. In these implementations, a presently playing symbol or icon 510 of the hybrid playlist interface 500 can indicate to the user which of the media files 502 of the hybrid playlist 501 is presently being played.

Playing Media Files

Figure 6A:
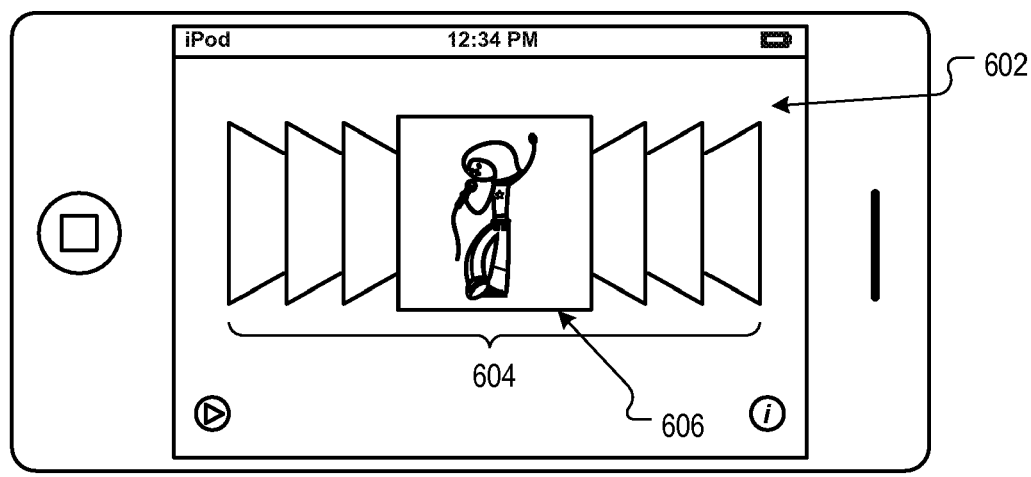
FIG. 6A illustrates an example of playing an audio file in a coverflow mode with a landscape orientation on a mobile device.
Figure 6B:
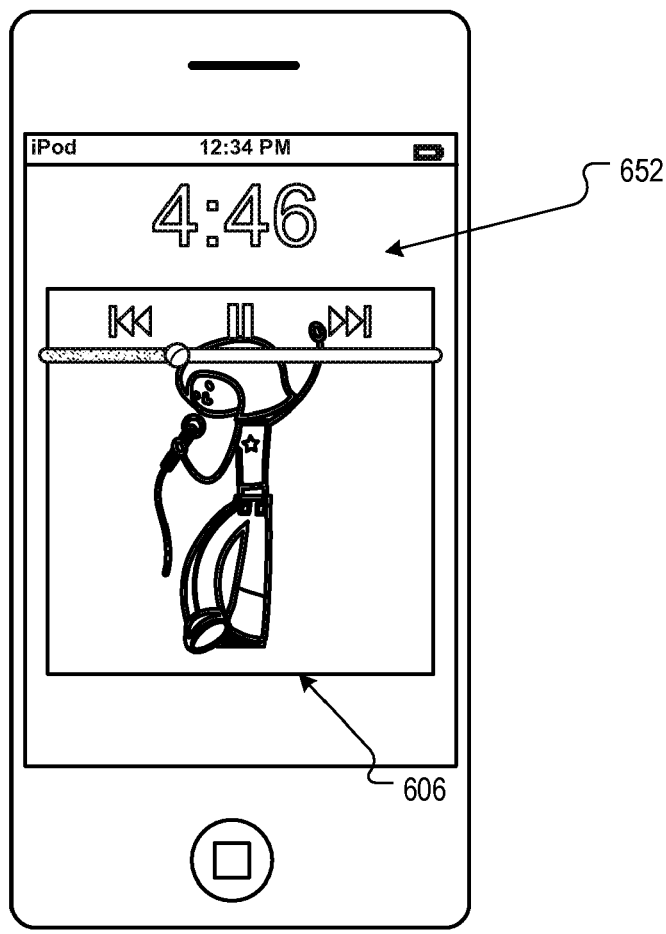
FIG. 6B illustrates an example of playing an audio file in a presentation mode with a portrait orientation on a mobile device.

FIG. 6A illustrates an example of playing an audio file in a coverflow mode 602 with a landscape orientation on a mobile device. In some implementations, an accelerometer (e.g., the accelerometer 172 of the mobile device 100 or 101 of FIGS. 1A and 1B, respectively) can be used to detect movement of the mobile device to determine an orientation (e.g., landscape or portrait) of the mobile device.

The coverflow mode 602 can be a display mode of an audio application. When an audio file (e.g., Song 1 of the hybrid playlist 501 of FIG. 5) is played on the mobile device, the mobile device plays an audio component of the audio file. Additionally, when the audio file is played in a coverflow mode 602 on the mobile device, the display of the mobile device includes representations 604 of multiple media files. The representations 604 can be, for example, images associated with the media files 502 included in the hybrid playlist 501. As an example, if a media file included in the hybrid playlist 501 is a song (e.g., Song 1), the representation 604 for the song can be an image (e.g., image 606) of the cover art of the album or compact disc which includes the song. As another example, if the media file included in the hybrid playlist 501 is a movie (e.g., Movie 1 of the hybrid playlist 501 of FIG. 5), the representation 604 for the movie in the coverflow mode 602 can be an image associated with the movie (e.g., a theatrical poster for the movie).

In some implementations, the representations 604 displayed in coverflow mode 602 are images associated with only media files that are of the same type (e.g., audio or video) as the media file that is presently being played on the mobile device. For example, if Song 1 of the hybrid playlist 501 of FIG. 5 is playing on the mobile device, the representations 604 displayed in coverflow mode 602 can be images associated with only audio files stored on the mobile device.

FIG. 6B illustrates an example of playing an audio file in a presentation mode 652 with a portrait orientation on a mobile device. An accelerometer can be used to detect that the mobile device is in portrait orientation.

The presentation mode 652 can be a display mode of an audio application. In addition to playing an audio component of the audio file (e.g., Song 1) on the mobile device, when the audio file is played in a presentation mode 652 on the mobile device, the display of the mobile device includes an image associated with the audio file that is presently being played. For example, if Song 1 of the hybrid playlist 501 is playing on the mobile device, the mobile device can display an image (e.g., image 606) of the cover art of the album or compact disc which includes Song 1. In some implementations, the presentation mode 652 does not include display of an image associated with any media file that is not presently being played. That is, in these implementations, the only image displayed in the presentation mode 652 is the image associated with the audio file that is presently being played.

In some implementations, an audio interface is displayed on the mobile device and includes information about the presently playing audio file (e.g., the audio file running time or the title of the audio file) and/or one or more controls (e.g., a backward, a pause, or a forward button) for changing the playing of the audio file.

Figure 7A:
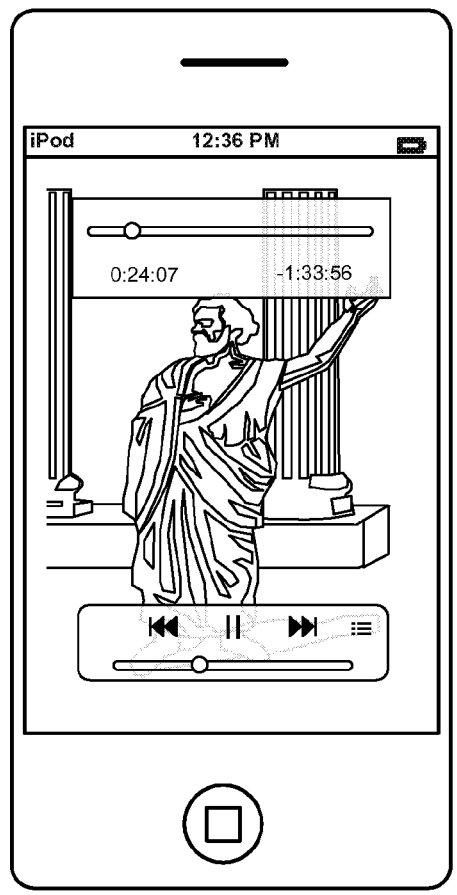
FIG. 7A illustrates an example of playing a video file with a portrait orientation on a mobile device.

FIG. 7A illustrates an example of playing a video file with a portrait orientation on a mobile device. An accelerometer can be used to detect that the mobile device is in portrait orientation.

Playing a video file of a hybrid playlist on a mobile device includes playing on the mobile device both an audio component of the video file and a video component of the video file. The example of FIG. 7A illustrates playing the video file while the mobile device is in portrait orientation. In some implementations, a video interface is displayed on the mobile device and includes information about the presently playing video file (e.g., the video file running time or the title of the video file) and/or one or more controls (e.g., a backward, a pause, or a forward button) for changing the playing of the video file.

In some implementations, the mobile device plays the video file in response to user selection of the video file. For example, the mobile device can receive user gesture input selecting, from the hybrid playlist interface 500 of FIG. 5, an arrow 508 associated with Movie 1 of the hybrid playlist 501. Receipt of the user input can cause a video application to play Movie 1 on the mobile device. For example, the mobile device can automatically launch a video application in response to the received user gesture input selecting the video file. The video application can be launched automatically without requiring further input from the user, e.g., user input closing or exiting the hybrid playlist interface 500 and user input selecting a video player object (e.g., the video player object 125 of the mobile device 101 of FIG. 1B) to launch a video player on the mobile device.

In some implementations, the mobile device automatically plays the video file without user selection of the video file. If the mobile device is playing the media files 502 of the hybrid playlist 501 in order (e.g., a random or shuffle order or a sequential order), the mobile device can play a particular media file of the playlist when that media file's position in the order is reached. For example, if the media files 502 are played in the sequential order illustrated in FIG. 5, the mobile device can automatically play Movie 1 after the mobile device completes playing Song 1.

Figure 7B:
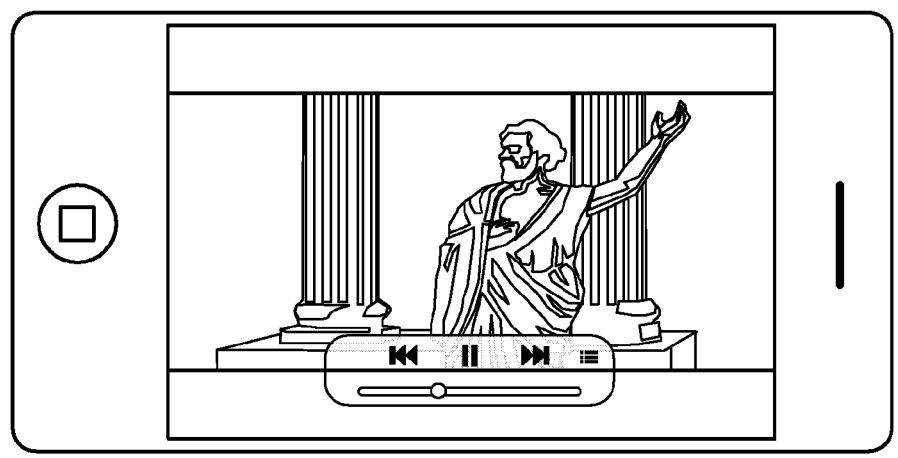
FIG. 7B illustrates an example of playing a video file with a landscape orientation on a mobile device.

FIG. 7B illustrates an example of playing a video file with a landscape orientation on a mobile device. In some implementations, a user can alternate between playing a video file in landscape or in portrait orientation by rotating the mobile device between vertical and horizontal positions. An accelerometer can be used to detect that the mobile device has changed between a portrait orientation and a landscape orientation. The example illustrates playing a particular clip of the video file (e.g., Movie 1 of the hybrid playlist 501 of FIG. 5) and displaying a video interface while the mobile device is in landscape orientation.

Figure 8:
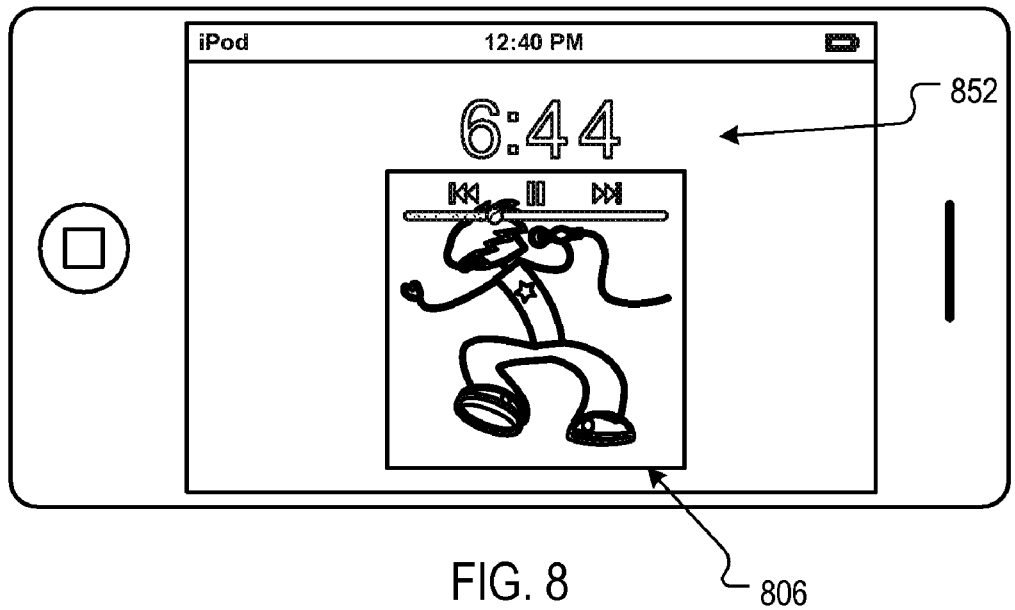
FIG. 8 illustrates an example of playing an audio file in a presentation mode with a landscape orientation on a mobile device.

FIG. 8 illustrates an example of playing an audio file in a presentation mode 852 with a landscape orientation on a mobile device.

The presentation mode 852 can be a display mode of an audio application. Similar to the presentation mode 652 of FIG. 6B, when the audio file is played in the presentation mode 852 on the mobile device, the display of the mobile device includes an image associated with the audio file that is presently being played. For example, if Song 2 of the hybrid playlist 501 is playing on the mobile device, the mobile device can display an image (e.g., image 806) of the cover art of the album or compact disc which includes Song 2. In some implementations, the presentation mode 852 does not include display of an image associated with any media file that is not presently being played.

In some implementations, if a video file (e.g., Movie 1) of a hybrid playlist is played in a landscape orientation on the mobile device and an audio file (e.g., Song 2) of the hybrid playlist is played just after completion of the playing of the video file in landscape orientation, the mobile device will play the audio file in the presentation mode 852 if the mobile device is still in landscape orientation. That is, if the audio file is played with a landscape orientation substantially immediately following the playing of a video file in landscape orientation, the mobile device can play the audio file in the presentation mode 852 instead of in a coverflow mode (e.g., the coverflow mode 602 of FIG. 6A).

Media File Playing Process

Figure 9:
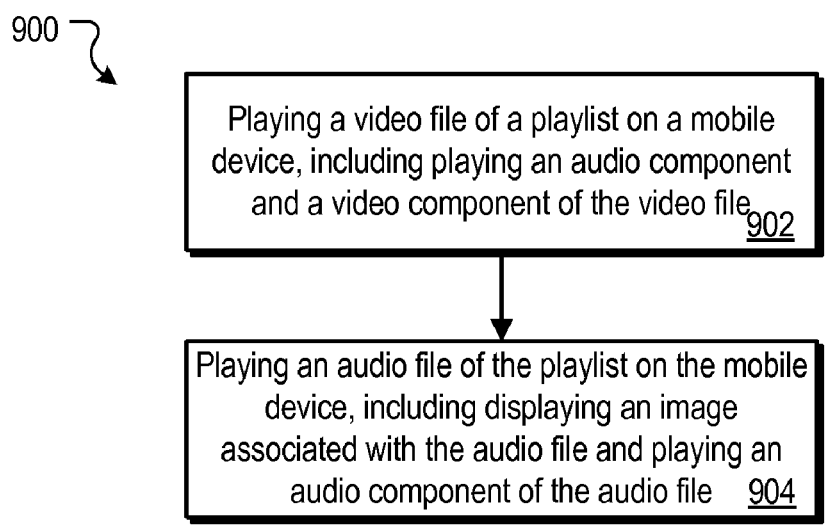
FIG. 9 illustrates an example process for playing media files of a hybrid playlist on a mobile device.

FIG. 9 illustrates an example process 900 for playing media files of a hybrid playlist on a mobile device. In some implementations, the method 900 can be used on mobile device 100 or 101 of FIGS. 1A and 1B, respectively.

A video file of a playlist is played on a mobile device (902). Playing the video file includes playing on the mobile device an audio component (e.g., a sound track) of the video file and playing on the mobile device a video component (e.g., a video track) of the video file. The playlist (e.g., a hybrid playlist) includes one or more audio files and one or more video files. In some implementations, the video file is played using a video application on the mobile device. In some implementations, the video file is played using the video application without requiring the user to launch the video application.

An audio file of the playlist is played on the mobile device (904). Playing the audio file includes displaying on the mobile device an image (e.g., cover art) associated with the audio file and playing on the mobile device an audio component of the audio file. In some implementations, the audio file is played using an audio application on the mobile device.

The media files can be played in a landscape orientation or a portrait orientation of the mobile device. A media file (e.g., a video file or an audio file) can be played automatically, e.g., during sequential or random play of the media files of a hybrid playlist. Alternatively, a media file (e.g., a video file or an audio file) can be played in response to user selection of the media file, e.g., from a hybrid playlist of media files.

The audio file can be played in a presentation mode with a portrait orientation of the mobile device or a coverflow mode with a landscape orientation of the mobile device. In some implementations, if the video file is played with a landscape orientation before the audio file is played, the audio file can be played in a presentation mode with a landscape orientation of the mobile device.

In some implementations, any type of media content can be included in a hybrid playlist. For example, in addition to audio files (e.g., songs, audio books, or audio podcasts), a user can add any type of video files (e.g., movies, television shows, music videos, or video podcasts) or other types of files (e.g., images and slideshows) to a hybrid playlist. In some implementations, the hybrid playlist is an on-the-go playlist, e.g., a playlist that is generated by a user on the mobile device when the mobile device is not physically connected (e.g., by one or more cables) or wirelessly connected to an access device (e.g., the access device 218 of FIG. 2), such as a personal computer.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
playing a first video file of a playlist on a mobile device, the playlist including one or more audio files and one or more video files, wherein each of the one or more audio files and the one or more video files are separately playable,
where playing the first video file of the one or more video files includes playing on the mobile device an audio component and a video component of the first video file; and
playing a first audio file of the one or more audio files, where playing the audio file includes determining whether to display an image in a presentation mode or a plurality of images in a coverflow mode based on a detected orientation of the mobile device and whether the first video file was played prior to the first audio file.

2. The method of claim 1, further comprising:
playing the first audio file in the presentation mode when the mobile device has a portrait orientation.

3. The method of claim 2, further comprising:
playing the first audio file in a presentation mode with a landscape orientation when the first video file was played with a landscape orientation before the first audio file is played.

4. The method of claim 2, further comprising:
when the first video file is played after the first audio file is played, playing the first audio file in a presentation mode when the device is detected to have a portrait orientation or in a coverflow mode when the device is detected to have a landscape orientation.

5. The method of claim 1, where the one or more video files include at least one of a movie, a television show, a music video, or a video podcast.

6. The method of claim 1, where the playlist is determined by a user of the mobile device.

7. The method of claim 1, where the mobile device includes a multi-touch-sensitive display.

8. A system comprising:
a processor and a memory operable to perform operations including:

playing a first video file of a playlist on a mobile device, the playlist including one or more audio files and one or more video files, wherein each of the one or more audio files and the one or more video files are separately playable, where playing the first video file of the one or more video files includes playing on the mobile device an audio component and a video component of the first video file; and playing a first audio file of the one or more audio files, where playing the audio file includes determining whether to display an image in a presentation mode or a plurality of images in a coverflow mode based on a detected orientation of the mobile device and whether the first video file was played prior to the first audio file.

9. The system of claim 8, further operable to perform operations comprising:
playing the first audio file in the presentation mode when the mobile device has a portrait orientation.

10. The system of claim 9, further operable to perform operations comprising:
playing the first audio file in a presentation mode with a landscape orientation when the first video file was played with a landscape orientation before the first audio file is played.

11. The system of claim 9, further operable to perform operations comprising:
when the first video file is played after the first audio file is played, playing the first audio file in a presentation mode when the device is detected to have a portrait orientation or a coverflow mode when the device is detected to have a landscape orientation.

12. The system of claim 8, where the one or more video files include at least one of a movie, a television show, a music video, or a video podcast.

13. The system of claim 8, where the playlist is determined by a user of the mobile device.

14. A non-transitory computer readable medium encoded with a computer program, operable to cause data processing apparatus to perform operations comprising:
playing a first video file of a playlist on a mobile device, the playlist including one or more audio files and one or more video files, wherein each of the one or more audio files and the one or more video files are separately playable, where playing the first video file of the one or more video files includes playing on the mobile device an audio component and a video component of the first video file; and playing a first audio file of the one or more audio files, where playing the audio file includes determining whether to display an image in a presentation mode or a plurality of images in a coverflow mode based on a detected orientation of the mobile device and whether the first video file was played prior to the first audio file.

15. The non-transitory computer readable medium encoded with the computer program of claim 14, further operable to perform operations comprising:
playing the first audio file in the presentation mode when the mobile device has a portrait orientation.

16. The non-transitory computer readable medium encoded with the computer program of claim 15, further operable to perform operations comprising:
playing the first audio file in a presentation mode with a landscape orientation when the first video file was played with a landscape orientation before the first audio file is played.

17. The non-transitory computer readable medium encoded with the computer program of claim 15, further operable to perform operations comprising:
when the first video file is played after the first audio file is played, playing the first audio file in a presentation mode when the device is detected to have a portrait orientation or a coverflow mode when the device is detected to have a landscape orientation.

18. The non-transitory computer readable medium encoded with the computer program of claim 14, where the one or more video files include at least one of a movie, a television show, a music video, or a video podcast.

19. The non-transitory computer readable medium encoded with the computer program of claim 14, where the playlist is determined by a user of the mobile device.

* * * * *